(12) United States Patent
Bae et al.

(10) Patent No.: US 10,492,112 B2
(45) Date of Patent: Nov. 26, 2019

(54) APPARATUS AND METHOD FOR PROVIDING DATA SERVICE USING HETEROGENEOUS NETWORK

(71) Applicant: Samsung Electronics Co., Ltd., Suwon-si, Gyeonggi-do (KR)

(72) Inventors: Jae-Hyeon Bae, Seoul (KR); Kyung-Mo Park, Seoul (KR); Young-Wan So, Gunpo-si (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/766,211

(22) PCT Filed: Oct. 13, 2016

(86) PCT No.: PCT/KR2016/011486
§ 371 (c)(1),
(2) Date: Apr. 5, 2018

(87) PCT Pub. No.: WO2017/065519
PCT Pub. Date: Apr. 20, 2017

(65) Prior Publication Data
US 2018/0295545 A1 Oct. 11, 2018

(30) Foreign Application Priority Data
Oct. 13, 2015 (KR) .................. 10-2015-0143121

(51) Int. Cl.
*H04L 12/28* (2006.01)
*H04W 36/00* (2009.01)
(Continued)

(52) U.S. Cl.
CPC ....... *H04W 36/0066* (2013.01); *H04W 36/02* (2013.01); *H04W 36/14* (2013.01);
(Continued)

(58) Field of Classification Search
CPC ............................................................ H04W 36/0066; H04W 36/02; H04W 36/18; H04W 84/12
(Continued)

(56) References Cited

U.S. PATENT DOCUMENTS

2014/0226572 A1 8/2014 Thota et al.
2014/0241322 A1* 8/2014 Kim .................. H04W 36/0016
370/331

(Continued)

FOREIGN PATENT DOCUMENTS

EP 1 622 315 A1 2/2006
FR 2 984 669 A1 6/2013
(Continued)

OTHER PUBLICATIONS

International Organization for Standardization Organisation Internationale De Normalisation ISO/IEC JTC1/SC291WG11 Coding of Moving Pictures and Audio; Jan. 2013, Geneva, Switzerland.
European Office Action dated Feb. 15, 2019, issued in a counterpart European application No. 16855736.1-1214.

* cited by examiner

*Primary Examiner* — John Pezzlo
(74) *Attorney, Agent, or Firm* — Jefferson IP Law, LLP (57) ABSTRACT

A method for determining a network for receiving, by a user terminal, data for a content service, according to an embodiment of the present disclosure, comprises the steps of: receiving the data from a first network; receiving transmission characteristic information of the data for receiving the data from the first network; obtaining network state information of a second network using information included in a packet header of the data; and determining whether to switch the network for receiving the data from the first network to the second network, on the basis of the transmission characteristic information and the second network information.

13 Claims, 4 Drawing Sheets

(51) Int. Cl.
*H04W 36/14* (2009.01)
*H04W 36/28* (2009.01)
*H04W 36/02* (2009.01)
*H04J 1/16* (2006.01)
*H04W 84/12* (2009.01)
*H04W 36/18* (2009.01)

(52) U.S. Cl.
CPC ............ *H04W 36/28* (2013.01); *H04W 36/18* (2013.01); *H04W 84/12* (2013.01)

(58) Field of Classification Search
USPC ........................................ 370/252, 329, 386
See application file for complete search history.

(56) References Cited

U.S. PATENT DOCUMENTS

| | | | |
|---|---|---|---|
| 2014/0313954 A1 | 10/2014 | Choi et al. | |
| 2015/0113580 A1 | 4/2015 | He et al. | |
| 2016/0088582 A1* | 3/2016 | Kim | H04W 76/10 370/329 |
| 2016/0227469 A1* | 8/2016 | Kim | H04W 4/14 |

FOREIGN PATENT DOCUMENTS

| | | |
|---|---|---|
| KR | 10-2011-0071823 A | 6/2011 |
| KR | 10-2012-0012580 A | 2/2012 |
| KR | 10-2012-0095576 A | 8/2012 |
| KR | 10-2012-0124119 A | 11/2012 |
| WO | 2011/091242 A2 | 7/2011 |

APPARATUS AND METHOD FOR PROVIDING DATA SERVICE USING HETEROGENEOUS NETWORK

CROSS-REFERENCE TO RELATED APPLICATION(S)

This application is a National Phase Entry of PCT International Application No. PCT/KR2016/011486, which was filed on Oct. 13, 2016, and claims priority to Korean Patent Application No. 10-2015-0143121, which was filed on Oct. 13, 2015, the contents of which are incorporated herein by reference.

TECHNICAL FIELD

The present disclosure relates to a method and an apparatus for providing data services using heterogeneous networks and, more particularly, to an apparatus and a method for determining a network through which a user terminal is provided with data services.

BACKGROUND ART

An increase in the mobile Internet speed due to the evolution of a network, such as LTE (long term evolution), and the highly improved performance of a mobile terminal brings about high-definition content which causes a sharp increase in the amount of traffic generated when reproducing mobile videos. The surge in wireless data traffic stems from an increase in the number of smartphone users, as well as mobile video and network evolution. Due to the rapid increase in the mobile data traffic, 80% of the mobile data traffic is generated on smartphones and mobile video traffic are expected to account for 60% of total mobile data traffic, respectively, in 2020. Such a sharp increase in the amount of wireless data traffic is attributed to an increase in the amount of mobile video traffic and the improvement in mobile video resolution. In fact, HD (high definition) video content is expected to account for 52% of global Internet protocol (IP) video traffic in 2018, up from 36% in 2013, while standard definition (SD) video content is expected to account for 37% thereof, down from 64% in 2013.

As a result of such an increase in the IP traffic, the actual global IP traffic in 2013 comprised 41% Wi-Fi, 3% cellular communication, and 56% wired communication, respectively, because of user data charge burdens.

Although there are various mobile video streaming services based on LTE unicast, most mobile video streaming users consume mobile video streaming services using Wi-Fi in order to avoid higher data charges, and thus only users in areas where Wi-Fi is not available use mobile video streaming services in a cellular environment such as LTE or the like.

Figure 1:
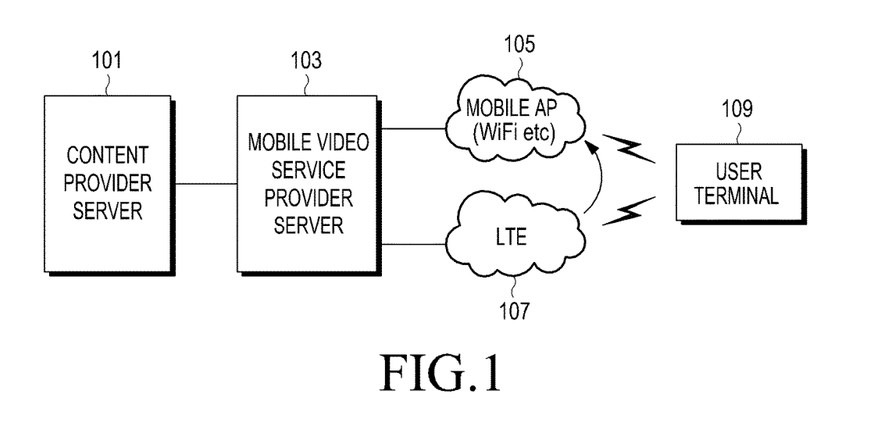
FIG. 1 is a view illustrating the configuration of a general system for providing a mobile video streaming service.

FIG. 1 is a view illustrating the configuration of a general system for providing mobile video streaming services.

The system shown in FIG. 1 includes a content provider server 101 for providing content, a service provider server 103 for providing a mobile video service, a Wi-Fi network 105, a cellular network 107, such as an LTE network, and a user terminal 109.

In the example of FIG. 1, the user terminal 109 may use the mobile video streaming service by accessing the Wi-Fi network 105 or the cellular network 107 depending on the surrounding environment while using the mobile video streaming service.

The existing mobile video streaming service provides convenience to mobile-video service users through switching between heterogeneous networks, such as Wi-Fi and LTE. However, the currently provided mobile video streaming service provides a network switching function for the mobile video streaming service with a long buffering time when switching between heterogeneous networks. Therefore, it is difficult to provide smooth service because interruption of the service or deterioration of quality may occur when switching networks in the real-time mobile video service. In addition, smooth service cannot be provided in the existing mobile video streaming service because the network switch is performed without consideration of content and a transmission environment when switching between heterogeneous networks.

DETAILED DESCRIPTION OF THE INVENTION

Technical Problem

Embodiments of the present disclosure provide an apparatus and a method for providing data services using heterogeneous networks.

Embodiments of the present disclosure provide an apparatus and a method for determining a network through which a user terminal receives data.

Embodiments of the present disclosure provide an apparatus and a method by which a user terminal obtains network state information.

Embodiments of the present disclosure provide an apparatus and a method by which a user terminal measures network state information.

Embodiments of the present disclosure provide an apparatus and a method for providing a seamless service when a user terminal switches between networks to receive a data service.

Technical Solution

A method of determining a network through which a user terminal receives data for a content service, according to an embodiment of the present disclosure, may include: receiving the data from a first network; receiving transmission characteristic information of the data for receiving the data from the first network; obtaining network state information of a second network using information included in a packet header of the data; and determining whether or not to switch the network for receiving the data from the first network to the second network based on the transmission characteristic information and the second network information.

A user terminal for determining a network for receiving data for a content service, according to an embodiment of the present disclosure, may include: a transmission/reception unit that receives the data from a first network and receives transmission characteristic information of the data for receiving the data from the first network; and a controller that obtains network state information of a second network and determines whether or not to switch the network for receiving the data from the first network to the second network based on the transmission characteristic information and the second network information.

MODE FOR CARRYING OUT THE INVENTION

Hereinafter, an embodiment of the present disclosure will be described in detail with reference to the accompanying drawings. In the following description of the present disclosure, a detailed description of known functions or configurations incorporated herein will be omitted when it may make the subject matter of the present disclosure rather unclear. The terms as described below are defined in consideration of the functions in the embodiments, and the meaning of the terms may vary according to the intention of a user or operator, convention, or the like. Therefore, the definitions of the terms should be made based on the contents throughout the specification.

Although the following embodiments of the present disclosure will be described separately for the convenience of description, two or more embodiments may be combined within the range where they are not in conflict with each other.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The apparatus and method proposed in the present disclosure are applicable to various communication systems such as a Long-Term Evolution (LTE) mobile communication system, a Long-Term Evolution-Advanced (LTE-A) mobile communication system, a High-Speed Downlink Packet Access (HSDPA) mobile communication system, a High-Speed Uplink Packet Access (HSUPA) mobile communication system, a High-Rate Packet Data (HRPD) mobile communication system of a third-Generation Project Partnership 2 (3GPP2), a Wideband code Division Multiple Access (WCDMA) mobile communication system of 3GPP2, a Code Division Multiple Access (CDMA) mobile communication system of 3GPP2, an 802.16m communication system of Institute of Electrical and Electronics Engineers (IEEE), an Evolved Packet System (EPS), a Mobile Internet Protocol (Mobile IP) system, or the like.

The term 'User Equipment (UE)' used in the present disclosure may refer to a Mobile Station (MS), a terminal, a User Terminal (UT), a wireless terminal, an Access Terminal (AT), a subscriber unit, a Subscriber Station (SS), a wireless device, a wireless communication device, a mobile node, a mobile, or some other devices.

Hereinafter, the following description will be made of an example in which a user terminal receives data using an LTE (long-term evolution) network or a Wi-Fi (wireless fidelity) network. However, it will be readily apparent to those skilled in the art that the present disclosure can be applied to other networks as well.

FIG. 1 shows an example of the configuration of a system in which a user terminal 109 can determine whether or not to switch between heterogeneous networks based on at least one of mobile AP state information provided from a mobile AP 105, LTE network state information provided from an LTE network 107, and transmission characteristic information for a corresponding mobile video service provided from a service provider server 103.

In the present disclosure, the user terminal determines whether or not to switch between heterogeneous networks for an MMT (MPEG media transport)-based mobile video streaming service provided by a mobile video streaming service provider based on transmission characteristic information thereof and channel information provided by a network service provider or a mobile AP such as Wi-Fi. The terminal may include components for determining whether or not to switch between heterogeneous networks in the mobile video service or an application for the same.

Figure 2:
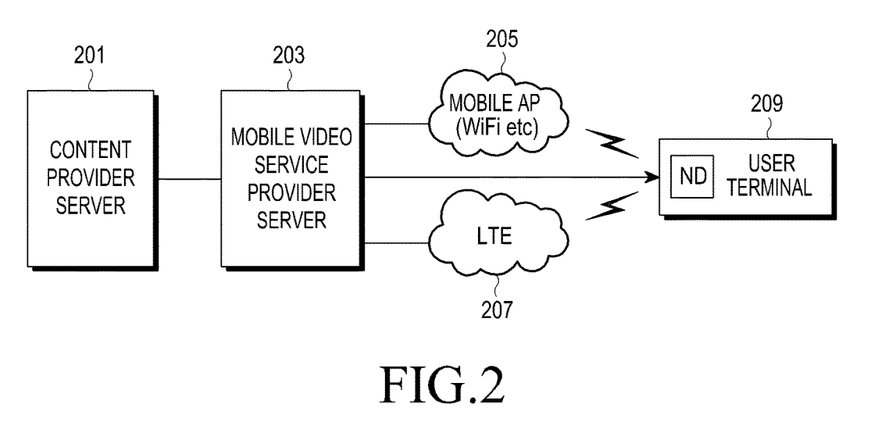
FIG. 2 is a configurational view of switching between heterogeneous networks in a mobile video service according to the present disclosure.

FIG. 2 is a configurational view of switching between heterogeneous networks in a mobile video service according to the present disclosure.

FIG. 2 shows an example of the configuration of a system in which a user terminal 209 can determine whether or not to switch between heterogeneous networks based on at least one of mobile AP state information provided from a mobile AP 205, LTE network state information provided from an LTE network 207, and transmission characteristic information for a corresponding mobile video service provided from a service provider server 203.

In the present disclosure, the transmission characteristics of a corresponding mobile video service (e.g., at least one of a data-rate, a data bandwidth, a data loss, a propagation delay, and buffer status) (hereinafter, referred to as "transmission characteristic information") are transmitted to a terminal through a signaling message in the MMT-based video streaming service {e.g., an asset delivery characteristic (ADC) message in the MMT system}, and the terminal determines network state information of a mobile AP, which is being connected with the terminal or is considered to be switched, in order to thereby determine network-switching between heterogeneous networks. Terms "network state information", "network channel state information", "network information", and the like may be used interchangeably with each other to mean information indicating the channel state between the user terminal and a corresponding network.

More specifically, when the mobile AP 205 is available to the user terminal 209 depending on the network state, the user terminal 209 makes a request to the mobile AP 205 for the network state information. The mobile AP 205, which has received the request, may transmit the network state information to the user terminal 209. The user terminal 209 may determine whether or not to switch between heterogeneous networks based on the network state information and the transmission characteristic information provided by an MMT-based video streaming service through a signaling message.

Alternatively, when the mobile AP 205 is available to the user terminal 209 depending on the network state, the user terminal 209 makes a request to the mobile AP 205 for the network state information. The user terminal 209 is required to directly measure the network state information when the network state information has not been delivered, or when network state information of the mobile AP 205 conforming to the actual environment of the user is required. In this case, the user terminal may directly measure the network state information of the corresponding mobile AP 205 using the information provided through the signaling message in the MMT-based video streaming service.

Figure 3:
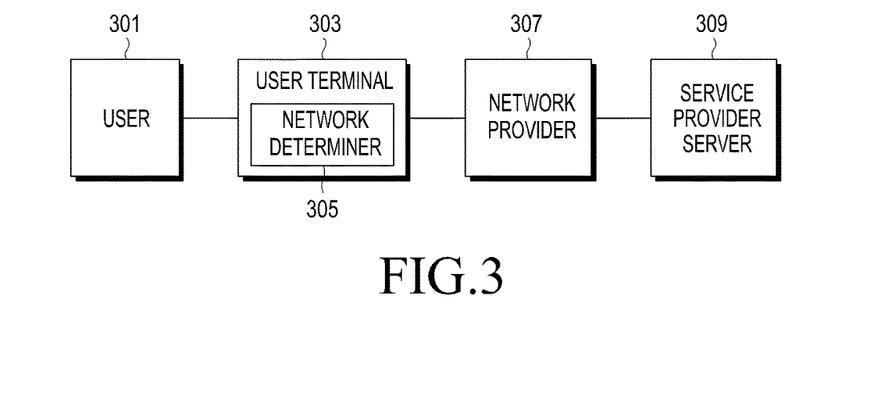
FIG. 3 is a view illustrating the configuration of a system according to an embodiment of the present disclosure.

FIG. 3 is a view illustrating the configuration of a system according to an embodiment of the present disclosure.

More specifically, FIG. 3 shows a configurational view in which a user terminal 303 uses a network determiner 305 in order to smoothly switch between an LTE network 307 and a Wi-Fi network 307 when a user 301 consumes a mobile video service.

The network determiner 305 receives content (or data) transmission characteristic information provided by a Content Provider (CP) or a mobile video service provider 309 and network state information of a mobile AP and determines whether or not to switch the currently used network based on the information above. The network determiner 305 periodically requests and receives information on the mobile AP, periodically updates the network state information, and determines whether or not to maintain the access to the current network based on the transmission characteristic information of the content. The network determiner 305 may determine whether or not to switch the network by directly measuring the network state information using signaling message information in the MMT service when the network determiner 305 uses the network state information provided by the mobile AP as it is, when the mobile AP network state information has been changed according to the surrounding environment, or when the mobile AP is not able to provide necessary network state information.

In an embodiment of the present disclosure, the mobile AP determines its own network state information, and when the user terminal 303 accesses the corresponding network and requests the network state information, the mobile AP provides the user 301 with the network state information thereof. The user terminal 303 determines content transmission characteristic information provided by the content provider or the mobile video service provider based on the received network state information of the mobile AP. For example, the user terminal 303 compares the network state information with the content transmission characteristic information, and if the network state information does not satisfy the content transmission characteristic information, the user terminal 303 continues to receive the service using the current network (LTE unicast), instead of accessing the mobile AP. If the network state information satisfies the content transmission characteristic information, the user terminal 303 receives the mobile video service using the mobile AP.

In another embodiment according to the present disclosure, the mobile AP determines its own network state information and transmits the current network state information thereof in response to a request of the user terminal 303. However, when insufficient network state information is received from the mobile AP, or when there is much variation in the surrounding network state of the user terminal 303, the user terminal 303 may directly measure and utilize the network state of the mobile AP. The user terminal 303 determines whether or not to switch the network by determining the content transmission characteristic information provided by the content provider or the mobile video service provider based on the measured mobile AP network state information.

For example, when the user terminal 303, which uses a mobile video service in an outdoor LTE network environment, enters an indoor mobile AP environment, the user terminal 303 makes a request to the mobile AP for network state information thereof and receives the same.

The mobile AP can recognize the state information of the mobile AP, such as a data-rate or a data bandwidth, based on the number of users connected to the mobile AP. However, since a packet loss, a data loss, or a propagation delay may vary depending on the actual position or environment of the user, it is difficult to accurately recognize the packet loss, the data loss, or the propagation delay. Therefore, the user terminal 303 may directly measure some measurable state information among the content transmission characteristic information, instead of receiving the same from the mobile AP, for usage.

The user terminal 303 may measure the packet loss or the data loss by determining a packet counter in the packet header of the MMTP (mpeg media transport protocol) received for a predetermined period. In addition, the user terminal 303 may measure the propagation delay by comparing a time-stamp in the header of the MMTP packet transmitted from a transmitter with the time of the user terminal 303 as a receiver.

As described above, the user terminal 303 may recognize the network state information between the mobile AP and the user terminal 303 based on the actual information in the MMTP packet header. The user terminal 303 compares the information determined above with content transmission characteristic information provided by the content provider or the mobile video service provider to thus determine whether or not to switch the network. If the mobile AP network state information does not satisfy the mobile video service transmission characteristic information, the user terminal 303 continues to use the mobile video service using the currently used LTE network.

For example, in order for the user to watch real-time live sports content at a full-HD level using the LTE network, a data-rate of 4 Mbps may be required, and a propagation delay of 1 second may be allowed. In this case, the information is transmitted, as content transmission characteristic information, to the user terminal 303. The user terminal 303 may search for a mobile AP (Wi-Fi), and may identify the network state information. As a result of the searching and identification, the data-rate may exceed 4 Mbps depending on the state of the user, but if the propagation delay may be measured to be 1 second or more. In this case, although the user terminal 303 can receive the content through the mobile AP, the user terminal 303 determines to receive the content using the LTE network because the network state of the mobile AP is determined to be poor.

As described above, the switching between heterogeneous networks can be applied in various manners according to the embodiments.

Figure 4:
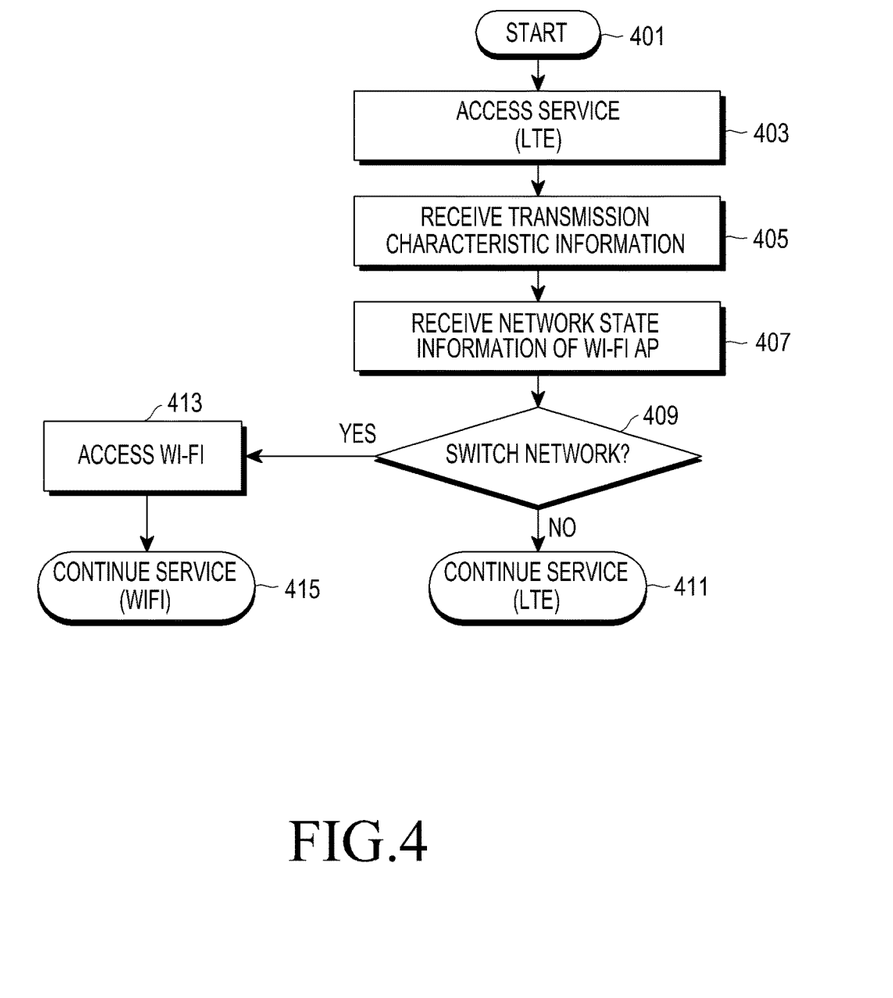
FIG. 4 is a view illustrating an operation in which a user terminal determines whether or not to switch between networks according to the present disclosure.

FIG. 4 is a diagram illustrating an operation in which a user terminal determines whether or not to switch between networks according to the present disclosure.

For example, the user terminal may access the LTE network first, and may then determine whether or not to switch to the Wi-Fi network.

The user terminal initiates a procedure for using a multimedia service (401). The user terminal accesses the LTE network (403). The user terminal receives transmission characteristic information necessary for receiving the data (405). For example, the transmission characteristic information may be requirements for the network necessary for reproducing a video without interruption or deterioration of the video streaming when the user wishes to play the video streaming using the user terminal. The user terminal receives information on the Wi-Fi network to which the user terminal wants to switch (407). Alternatively, the user terminal may directly measure the Wi-Fi network information, instead of receiving the information from the Wi-Fi network.

The user terminal determines whether or not to switch to the Wi-Fi network based on the Wi-Fi network information and the transmission characteristic information necessary for receiving the data (409). That is, the user terminal determines whether or not the Wi-Fi network satisfies transmission characteristic information necessary for receiving the data based on the Wi-Fi network information. If the user terminal determines not to switch to the Wi-Fi network, the user terminal continues to receive the data through the currently connected LTE network (411).

On the other hand, if the user terminal determines to receive the data using the Wi-Fi network, the user terminal access the Wi-Fi network (413). Thereafter, the user terminal continues to receive the data through the Wi-Fi network (415).

Figure 5:
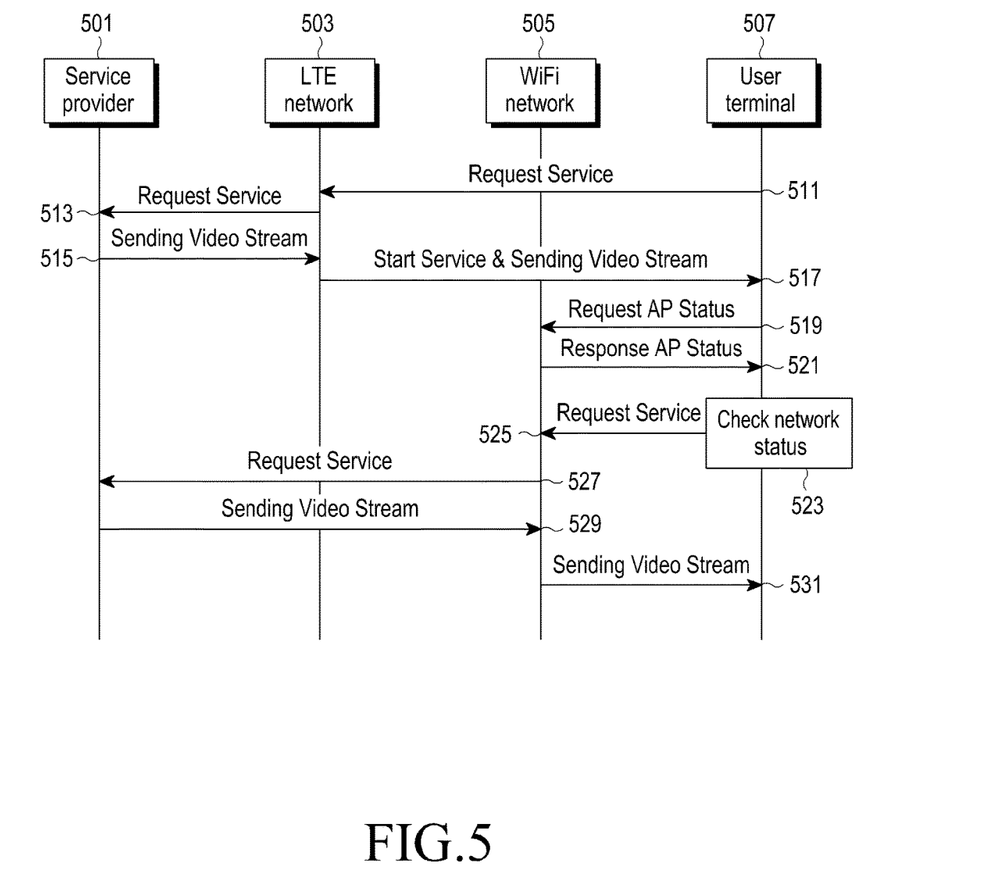
FIG. 5 is a view illustrating transmission/reception of messages between entities for network switching when using a mobile video service according to an embodiment of the present disclosure.

FIG. 5 is a view illustrating transmission/reception of messages between entities for network switching when using a mobile video service according to an embodiment of the present disclosure.

The user terminal 507 makes a request to the LTE network 503 for a service (511). The service, for example, may be real-time live sports content. The LTE network 503 makes a request for the service to a service provider 501 providing the real-time live sports content (513). The service provider 501 transmits the content data to the LTE network 503 (515). The LTE network 503 transmits the content data to the user terminal 507 (517). At this time, the content data includes transmission characteristic information of the service. The transmission characteristic information may be transmitted through a signaling message in a predetermined format.

When the Wi-Fi network 505 is available to the user terminal 507, the user terminal 507 makes a request to the Wi-Fi network 505 for state information of the Wi-Fi network 505 (519). The Wi-Fi network 505 recognizes its own state information and transmits the same to the user terminal 507 (521).

The user terminal 507 determines whether or not to switch the network to the Wi-Fi network 505 based on the transmission characteristic information of the content data and the state information of the Wi-Fi network 505 (523). More specifically, if the state information satisfies the requirements of the transmission characteristic information, the user terminal may determine to switch the network.

When the user terminal 507 determines to switch the network to the Wi-Fi network 505, the user terminal 507 makes a request to the Wi-Fi network 505 for the corresponding content data (525). The Wi-Fi network 505 makes a request to the service provider 501 for the content data (527). The service provider 501 transmits the content data to the Wi-Fi network 505 (529). The Wi-Fi network 505 transmits the content data to the user terminal 507 (531).

Figure 6:
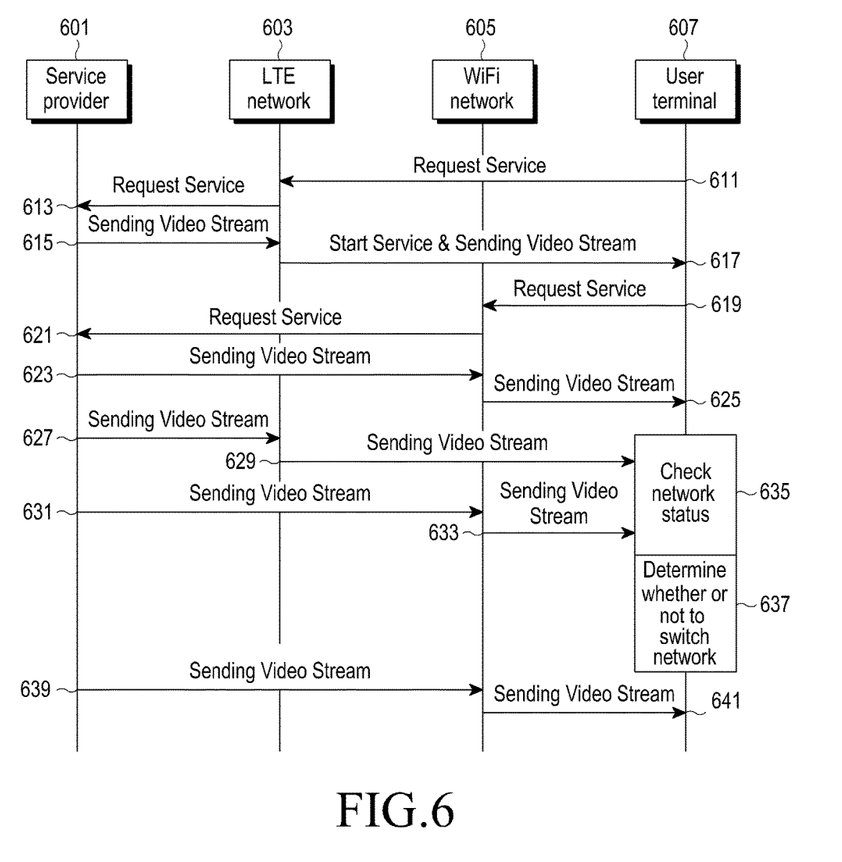
FIG. 6 is a view illustrating transmission/reception of messages between entities for network switching when using a mobile video service according to another embodiment of the present disclosure.

FIG. 6 is a view illustrating transmission/reception of messages between entities for network-switching when using a mobile video service according to another embodiment of the present disclosure.

The user terminal 607 makes a request to the LTE network 603 for a service (611). The service, for example, may be real-time live sports content. The LTE network 603 makes a request for the service to a service provider 601 providing the corresponding content (613). The service provider 601 transmits the content data to the LTE network 603 (615). The LTE network 603 transmits the content data to the user terminal 607 (617). At this time, the content data includes transmission characteristic information of the service. The transmission characteristic information may be transmitted through a signaling message in a predetermined format.

When the Wi-Fi network 605 is available to the user terminal 607, the user terminal 607 makes a request to the Wi-Fi network 605 for the content for a predetermined time in order to determine whether or not to switch to the Wi-Fi network 605 (619). The Wi-Fi network 605 makes a request to the service provider 601 providing the content for a predetermined time (621). The service provider 601 transmits the content data to the Wi-Fi network 605 (623). The Wi-Fi network 605 transmits the content data to the user terminal 607 (625). In addition, the service provider 601 transmits the content data to the LTE network 603 as well (627). The LTE network 603 transmits the content data to the user terminal 607 (629).

The service provider 601 transmits the content data to the Wi-Fi network 605 through a video stream (631). The Wi-Fi network 605 transmits the content data to the user terminal 607 (633).

The user terminal 607 examines the states of the two networks while receiving the content data through the Wi-Fi network 605 and the LTE network 603 (635). The steps 627, 629, 631, and 633 are the same as the steps 615, 617, 623, and 625, in which the user terminal 607 performs the step 635. The user terminal 607 determines the network to receive the content data based on the examined states of the two networks (637). If it is determined that the state of the Wi-Fi network 605 is poor (below a predetermined reference), the user terminal 607 may determine to receive the content data using the LTE network 603.

The service provider 601 transmits the content data to the Wi-Fi network 605 (639). The Wi-Fi network 605 transmits the content data to the user terminal 607 (641).

Meanwhile, when a user terminal, which uses a mobile video service in an LTE environment, enters a mobile AP environment, the user terminal may receive the corresponding service through both the LTE unicast and the mobile AP for a predetermined time in order to thereby determine whether or not to switch the network. Thereafter, the user terminal performs a network switch to the mobile AP for a buffering time stored therein, thereby using a service seamlessly even when a live service is provided.

For example, the user terminal receives the same packet or service through both the LTE and the Wi-Fi network at the same time for a buffering time of the user terminal in order to determine whether or not to switch the network, instead of searching for the mobile AP in the LTE environment and immediately determining whether or not to switch the network. The user terminal may receive the data through two transmission networks, namely LTE and Wi-Fi, and may recognize network state information between the mobile AP and the user terminal based on information in the header of an MMTP packet received during a predetermined period of time (e.g., terminal buffering time). For example, the user terminal may recognize the network state information between the mobile AP and the user terminal by measuring a packet loss or the like using the value of a "packet counter" of the MMTP packet. The user terminal compares the measured network state information of the mobile AP with the content transmission characteristic information provided by the content provider or the mobile video service provider, and determines to switch the network to the corresponding mobile AP.

According to this, when switching the network between the LTE and the mobile AP, the user terminal may receive the mobile video in advance for a buffering time of the corresponding terminal, and may use the content stored in a terminal buffer when switching the network, thereby providing the user with seamless mobile video service when switching the network.

Furthermore, even if the network state of the mobile AP is not satisfactory for providing the current mobile video content, the user terminal may be provided with the service through the mobile AP by lowering the resolution of the mobile video content according to the user's selection. For example, the terminal user who is using a service in the LTE environment may prefer to access a free network regardless of the resolution of the mobile video content.

When a service user who is using the mobile video service in the LTE environment searches for a mobile AP, the service user requests the network state information of the mobile AP or directly measures the same using the user terminal in order to access the mobile AP. The user terminal compares the network state information of the mobile AP obtained in the manner described above with the content transmission characteristic information provided by the content provider or the mobile video service provider in order to thereby determine to switch the network to the mobile AP. However, if the terminal user gives access priority to a mobile AP (Wi-Fi) that can be used free of charge, the user terminal searches for information that conforms to the network state information of the corresponding mobile AP among the content transmission characteristic information provided by the content provider or the mobile video service provider.

For example, when a user provided with a mobile video service of full-HD images in the LTE environment accesses a mobile AP in a public place according to a user's setting (for example, free data usage or the like), and if the data-rate of the corresponding mobile AP is measured at 2 Mbps through the network state information of the corresponding mobile AP, the user may determine to use a mobile video service of an HD level through the corresponding mobile AP from the content transmission characteristic information provided by the content provider or the mobile video service provider. Based on this, the service user terminal may be provided with the mobile video service through the corresponding mobile AP by lowering the resolution of the mobile video, which has been viewed in the existing LTE, from the full-HD level to the HD level.

Figure 7:
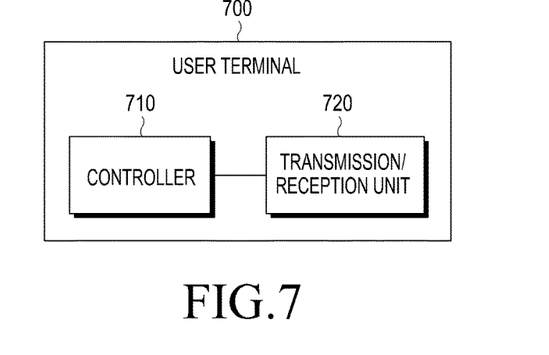
FIG. 7 is a view illustrating the configuration of a user terminal according to the present disclosure.

FIG. 7 is a view illustrating the configuration of a user terminal according to the present disclosure.

The user terminal 700 includes a controller 710 and a transmission/reception unit 720.

The controller 710 controls overall operations according to the embodiments of the present disclosure described above. As described above, the controller may determine the network through which a data service is provided based on the transmission characteristic information and the network state information. For example, the controller may determine whether or not to receive data using Wi-Fi while receiving the data using an LTE network. In addition, the controller 710 may control the operation of the transmission/reception unit 720.

The transmission/reception unit 720 may be provided with a data service using the LTE network or the Wi-Fi network, may receive transmission characteristic information for the data service, and may request and receive state information of the networks.

For the convenience of description, components that are not directly related to the present disclosure are omitted in the drawings and the description. Although the operations are performed by a plurality of components in the present specification, all of the operations may be performed by a single component as necessary.

According to the present disclosure, since the user terminal determines to switch between heterogeneous networks (e.g., LTE unicast/Wi-Fi), when a mobile video service is provided, by comparing content transmission characteristic information (e.g., a data-rate, a data bandwidth, a data loss, a propagation delay, buffer status, or the like) provided by a content provider or a mobile video service provider with network state information of a mobile AP (access point) to which the network is to be switched, it is possible to provide the user of the user terminal with smooth and seamless service when switching between the heterogeneous networks.

Particular aspects of the present disclosure may be implemented as a computer-readable code in a computer-readable recording medium. The computer-readable recording medium is a predetermined data storage device which can store data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

The invention claimed is:

1. A method of determining a network for receiving data for a content service by a user terminal, the method comprising:
   receiving at least one first packet for the data from a first network;
   receiving transmission characteristic information of the data through a signalling message;
   receiving at least one second packet for the data from the second network;
   obtaining network state information of a second network using information included in a header of the at least one second packet; and
   determining whether to switch from the first network to the second network based on the transmission characteristic information and the network state information of the second network,
   wherein the transmission characteristic information includes at least one of information for a requirement related to a loss of the data or information for a requirement related to a delay of the data.

2. The method of claim 1, wherein the information included in the header of the at least one second packet includes a packet counter and a time-stamp.

3. The method of claim 2, wherein the network state information of the second network comprises at least one of a packet loss measured based on the packet counter and a propagation delay measured based on the time-stamp.

4. The method of claim 1, further comprising determining to switch to the second network if the second network satisfies the transmission characteristic information based on the network state information.

5. The method of claim 4, further comprising, in response to determination to switch to the second network, switching from the first network to the second network using the data stored in a buffer.

6. The method of claim 1, wherein the switching from the first network to the second network is determined based on a user's pre-setting in the user terminal.

7. The method of claim 1, wherein the first network is an LTE (long-term evolution) network and the second network is a Wi-Fi (wireless fidelity) network.

8. A user terminal for determining a network for receiving data, the user terminal comprising:
   a transceiver configured to:
      receive at least one first packet for the data from a first network,
      receive transmission characteristic information of the data for receiving the data through a signalling message, and
      receive at least one second packet for the data from the second network; and
   at least one processor configured to:
      obtain network state information of a second network using information included in a header of the at least one second packet, and
      determine whether to switch from the first network to the second network based on the transmission characteristic information and network state information of the second network,
   wherein the transmission characteristic information includes at least one of information for a requirement related to a loss of the data or information for a requirement related to a delay of the data.

9. The user terminal of claim 8, wherein the information included in the header of the at least one second packet includes a packet counter and a time-stamp.

10. The user terminal of claim 9, wherein the network state information of the second network comprises at least one of a packet loss measured based on the packet counter and a propagation delay measured based on the time-stamp.

11. The user terminal of claim 8, wherein the at least one processor is further configured to determine to switch to the second network if the second network satisfies the transmission characteristic information based on the network state information.

12. The user terminal of claim 8, wherein the switching from the first network to the second network is determined based on a user's pre-setting in the user terminal.

13. The user terminal of claim 8, wherein the first network is an LTE (long-term evolution) network and the second network is a Wi-Fi (wireless fidelity) network.

* * * * *